US011386241B2

United States Patent
Lu et al.

(10) Patent No.: US 11,386,241 B2
(45) Date of Patent: Jul. 12, 2022

(54) HOST SYSTEM AND METHOD FOR UNLOCKING ELECTRONIC LOCK

(71) Applicant: Nuvoton Technology Corporation, Hsinchu (TW)

(72) Inventors: Chia-Ching Lu, Hsinchu (TW); Shih-Hao Yeh, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 517 days.

(21) Appl. No.: 16/232,068

(22) Filed: Dec. 26, 2018

(65) Prior Publication Data

US 2019/0205574 A1 Jul. 4, 2019

(30) Foreign Application Priority Data

Dec. 28, 2017 (TW) ................. 106146279

(51) Int. Cl.
| | |
|---|---|
| *G06F 21/85* | (2013.01) |
| *G06F 1/18* | (2006.01) |
| *G06F 13/42* | (2006.01) |
| *G07C 9/00* | (2020.01) |
| *G06F 13/40* | (2006.01) |

(52) U.S. Cl.
CPC .............. *G06F 21/85* (2013.01); *G06F 1/184* (2013.01); *G06F 1/189* (2013.01); *G06F 13/409* (2013.01); *G06F 13/4282* (2013.01); *G07C 9/00571* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 6,904,373 B2 | 6/2005 | Le et al. | |
| 8,335,931 B2 | 12/2012 | Lee et al. | |
| 2006/0107073 A1 | 5/2006 | Lane et al. | |
| 2012/0325126 A1* | 12/2012 | Tran ................ | H03M 13/2963 109/29 |
| 2013/0205723 A1* | 8/2013 | Blake ................ | G07D 9/00 53/473 |

(Continued)

FOREIGN PATENT DOCUMENTS

| | | |
|---|---|---|
| CN | 201033980 | 3/2008 |
| CN | 103679890 | 3/2014 |
| TW | I462681 | 11/2014 |

*Primary Examiner* — Henry Tsai
*Assistant Examiner* — Christopher A Bartels
(74) *Attorney, Agent, or Firm* — JCIPRNET

(57) ABSTRACT

A host system and a method for unlocking an electronic lock are provided. The host system includes a chassis, an electronic lock and a system circuit board. The chassis has a side door. The electronic lock is arranged on the side door for locking the side door on the chassis. The system circuit board is configured in the chassis, coupled to the electronic lock, and the system board has a plurality of universal serial bus ports. When the system board is not activated and a trigger voltage is received, the system circuit board detects an input sequence in which the USB ports are being inserted, and when the input sequence is equal to a predetermined sequence, the system circuit board outputs an unlock signal to the electronic lock so as to unlock the electronic lock device.

15 Claims, 2 Drawing Sheets

(56) References Cited

U.S. PATENT DOCUMENTS

| | | | |
|---|---|---|---|
| 2013/0212704 A1* | 8/2013 | Shablygin | G06F 21/6272 |
| | | | 726/28 |
| 2014/0283018 A1 | 9/2014 | Dadu et al. | |
| 2015/0302678 A1* | 10/2015 | Blake | G07D 9/06 |
| | | | 453/62 |
| 2015/0320209 A1* | 11/2015 | Hasselback | E05B 49/00 |
| | | | 348/151 |
| 2016/0053526 A1* | 2/2016 | Dittrich | E05G 1/04 |
| | | | 109/38 |
| 2019/0363881 A1* | 11/2019 | Bakalis | H04L 9/3239 |
| 2020/0065283 A1* | 2/2020 | Jayaraman | G06F 13/4282 |
| 2020/0370360 A1* | 11/2020 | Lowry | G06F 3/1423 |
| 2021/0075238 A1* | 3/2021 | Gharabegian | H02J 7/0013 |

* cited by examiner

HOST SYSTEM AND METHOD FOR UNLOCKING ELECTRONIC LOCK

CROSS-REFERENCE TO RELATED APPLICATION

This application claims the priority benefit of Taiwan application no. 106146279, filed on Dec. 28, 2017. The entirety of the above-mentioned patent application is hereby incorporated by reference herein and made a part of this specification.

BACKGROUND

Technical Field

The invention is related to a host system, and more particularly, to a host system and a method for unlocking an electronic lock thereof.

Description of Related Art

Currently, in most computer chassis that adopt an electronic lock, a user can turn on or turn off an electronic lock of a computer chassis via inputting an electronic lock password through a basic input and output system (BIOS) only when a computer is powered on. If the computer is powered off or the host in in an abnormal condition, the user is unable to enter the security system, namely, the user is unable to turn on a security authentication mechanism, and thus is unable to unlock the electronic lock of the computer chassis.

SUMMARY

The invention is directed to a host system and a method for unlocking an electronic lock, which can enter a security authentication mechanism to unlock the electronic lock when the host system is in a non-activated state.

The host system of the invention includes a chassis, an electronic lock and a system circuit board. The chassis has a side door. The electronic lock is arranged on the side door for locking the side door on the chassis. The system circuit board is disposed within the chassis and coupled to the electronic lock, and the system circuit board has a plurality of universal serial bus ports. When the system circuit board is not activated and receives a trigger voltage, the system circuit board detects an input sequence in which the universal serial bus ports are being inserted, and when the input sequence is equal to a predetermined sequence, the system circuit board outputs an unlock signal to the electronic lock so as to unlock the electronic lock.

The method for unlocking the electronic lock of the host system of the invention includes the following steps: detecting whether a system circuit board of the host system is not activated; when the system circuit board of the host system is not activated, determining whether the system circuit board has received a trigger voltage; when the system circuit board is not activated and the trigger voltage is received, detecting, via a control chip of the system circuit board, an input sequence in which a plurality of universal serial bus ports is being inserted; comparing the input sequence with a predetermined sequence by the control chip; and when the input sequence is equal to the predetermined sequence, outputting an unlock signal from the control chip to the electronic lock so as to unlock the electronic lock.

In view of the above, in the host system and the method for unlocking the electronic lock of the embodiments of the invention, when the not activated system circuit board is influenced by the trigger voltage to enable components related to the security authentication mechanism to be activated, the system circuit board can detect the input sequence in which the universal serial bus ports are being inserted to determine whether or not to unlock the electronic lock. This allows the user to enter the security authentication mechanism under the condition that the system circuit board is not activated, so as to unlock the electronic lock.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
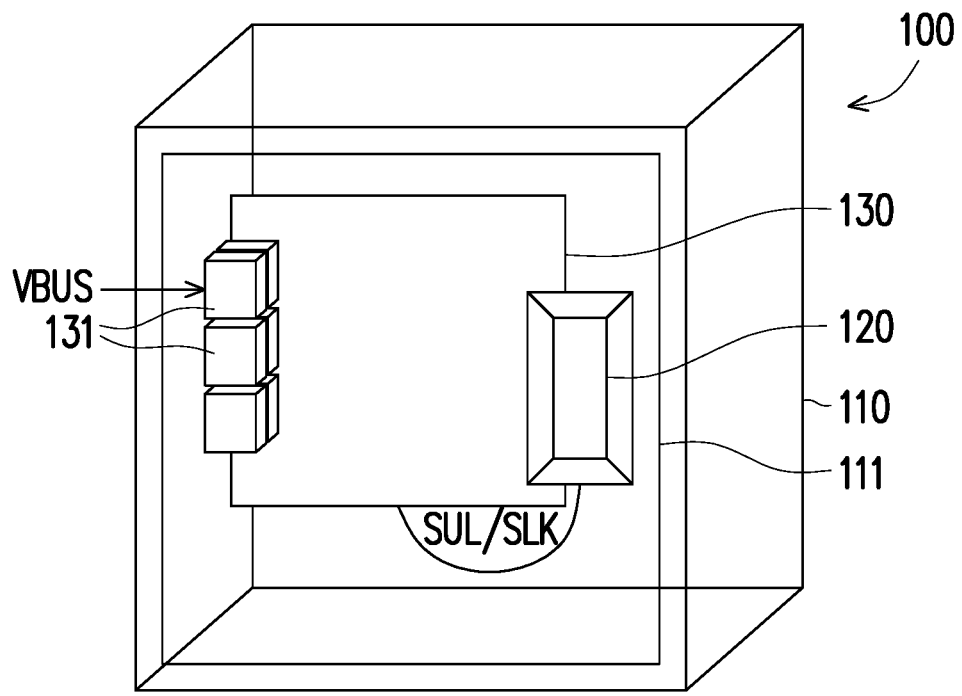
FIG. 1 is a schematic structural diagram illustrating a host system according to an embodiment of the invention.

FIG. 1 is a schematic structural diagram illustrating a host system according to an embodiment of the invention. Referring to FIG. 1, in the present embodiment, the host system 100 includes a chassis 110, an electronic lock 120 and a system circuit board 130, wherein the chassis 110 has a side door 111 which can rotate to expose the interior of the chassis 110. The electronic lock 120 is arranged on the side door 111 for locking the side door 111 on the chassis 110. That is, when the electronic lock 120 is in an unlock state, the side door 111 can rotate freely, and when the electronic lock 120 is in a lock state, the side door 111 is unable to rotate.

The system circuit board 130 is disposed within the chassis 110 and coupled to the electronic lock 120, and the system circuit board 130 has a plurality of universal serial bus ports 131. When the system circuit board 130 is not activated and receives a trigger voltage (such as an external power supply voltage VBUS provided by a power key), the system circuit board 130 detects an input sequence in which the universal serial bus ports 131 are being inserted. Next, the system circuit board 130 compares the input sequence with a predetermined sequence. When the input sequence is equal to the predetermined sequence, the system circuit board 130 outputs an unlock signal SUL to the electronic lock 120 for unlocking the electronic lock 120; and when the input sequence is not equal to the predetermined sequence, the system circuit board 130 does not output any signal to the electronic lock 120, but still detects whether or not the universal serial bus ports 131 are being inserted so as to compare a new input sequence with the predetermined sequence upon the generation of the new input sequence.

For example, assuming there are six universal serial bus ports 131 (referring to as A to F), then the predetermined sequence may be "A", "C", "E", that is, the universal serial bus ports 131 are being inserted in an order of "A", "C", "E"; or the predetermined sequence may be "A", "F", "E", "D", "A"; or the predetermined sequence may be "A", "FC", "D", "A", wherein "FC" indicates that two of the universal serial bus ports 131 are being inserted at the same time. On the other hand, taking the predetermined sequence being "A", "C", "E" for an example, when the input sequence is "A", "D", "E", the input sequence is considered as being different from the predetermined sequence; when the input sequence is "A", "C", "E", the input sequence is considered as being equal to the predetermined sequence; when the input sequence is "E", "D", "A", "C", "E", the input sequence is still considered as being equal to the predetermined sequence. That is, the system circuit board 130 only takes the most recent insertions that are corresponded to the number of insertion in the predetermined sequence and ignores the older ones.

According to the above, when the system circuit board 130 is influenced by the external power supply voltage VBUS to enable components related to a security authentication mechanism to be activated, the system circuit board 130 can detect the input sequence in which the universal serial bus ports 131 are being inserted so as to determine whether or not to unlock the electronic lock 120. This allows the user to enter the security authentication mechanism under the condition that the system circuit board 130 is not activated, so as to unlock the electronic lock 120.

On the other hand, when the system circuit board 130 is activated, the system circuit board 130 can be controlled by a setting of a human-machine interface of the system circuit board 130 to provide a lock signal SLK to the electronic lock 120, so as to lock the electronic lock 120.

Figure 2:
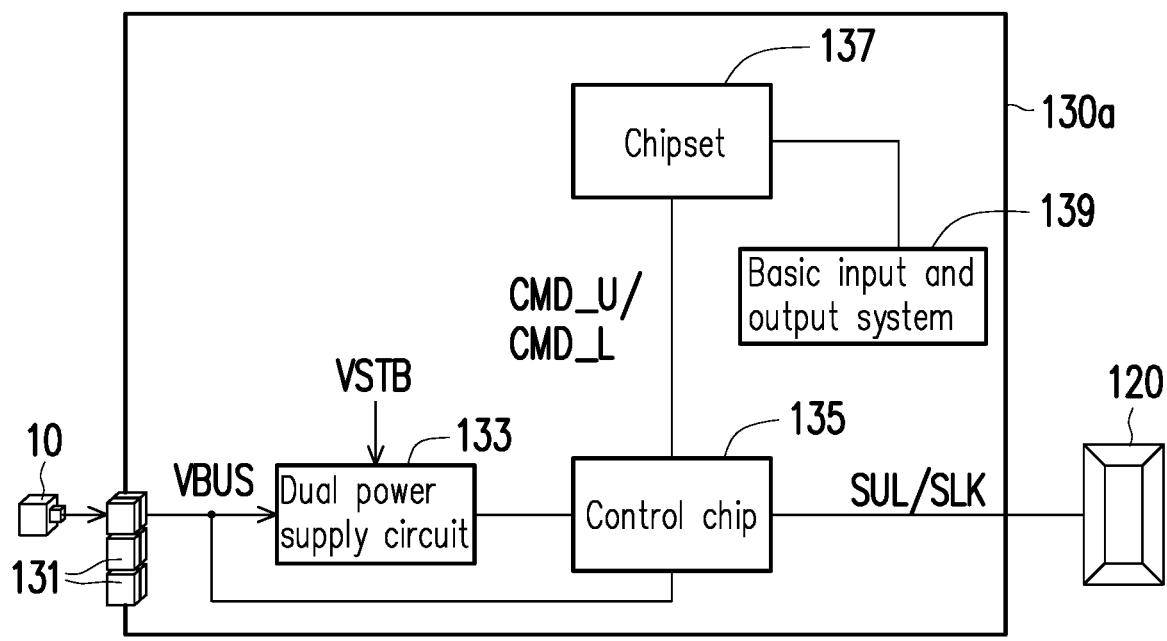
FIG. 2 is a schematic system diagram illustrating a system circuit board unlocking an electronic lock according to an embodiment of the invention.

FIG. 2 is a schematic system diagram illustrating a system circuit board unlocking an electronic lock according to an embodiment of the invention. Referring to FIG. 1 and FIG. 2, in the present embodiment, the system circuit board 130a is, for example, a motherboard, but the invention is not limited thereto, wherein identical or similar components are being represented by identical or similar reference numerals. Other than the universal serial bus ports 131, the system circuit board 130a further includes a dual power supply circuit 133, a control chip 135, a chipset 137 and a basic input and output system 139. The control chip 135 is, for example, a super I/O chip or an embedded controller (EC).

The dual power supply circuit 133 is coupled to the universal serial bus ports 131. The control chip 135 is coupled between the universal serial bus ports 131, the dual power supply circuit 133, the chipset 137 and the electronic lock 120. Moreover, the chipset 137 is coupled between the control chip 135 and the basic input and output system 139.

In one embodiment of the invention, when the system circuit board 130a is turned off (such that the motherboard is in a G3 state), the system circuit board 130a does not provide any voltage to the dual power supply circuit 133, that is, the dual power supply circuit 133 does not receive the standby power supply voltage VSTB. Moreover, the chipset 137 and the basic input and output system 139 are in a state of being not activated, namely, in a non-operable state.

Next, when a power key having an external power supply voltage VBUS (herein, take a universal serial bus device 10 having an external power supply voltage VBUS for an example) is inserted into one of the universal serial bus ports 131, the external power supply voltage VBUS is firstly transmitted to the dual power supply circuit 133 and the control chip 135, and then the dual power supply circuit 133 receives the external power supply voltage VBUS and transmits the external power supply voltage VBUS to the control chip 135 as an operating power. Moreover, the control chip 135, as triggered by the external power supply voltage VBUS being directly received by the universal serial bus ports 131, executes a detection mechanism to detect the input sequence in which the universal serial bus ports 131 are being inserted. The universal serial bus device 10 having the external power supply voltage VBUS is, for example, a portable power supply and/or a voltage adaptor having a universal serial bus plug.

At this moment, the control chip 135 can be activated by drawing the external power supply voltage VBUS from the universal serial bus device 10 that is inserted into the universal serial bus ports 131, and then detect the input sequence in which the universal serial bus ports 131 are being inserted. Next, the control chip 135 compares the input sequence with the predetermined sequence. When the input sequence is equal to the predetermined sequence, the control chip 135 outputs the unlock signal SUL to the electronic lock 120 for unlocking the electronic lock 120; and when the input sequence is not equal to the predetermined sequence, the control chip 135 does not output any signal to the electronic lock 120, but still detects whether or not the universal serial bus ports 131 are being inserted so as to compare a new input sequence with the predetermined sequence upon the generation of the new input sequence.

In the embodiment of the invention, the control chip 135 may include a mechanism of "recording several consecutive errors in the unlocking procedure", such that if the control chip 135 detects n times of insertion in a row, but the input sequences in the n times of insertion are all not equal to the predetermined sequence (n may, for example, be greater than or equal to 2, but not limited thereto), then the control chip 135 will prolong a lock enabled interval (namely, enter into an unlock disabled interval), or will be completely locked and no longer able to be unlocked (for example, must be taken back to the original factory to be opened with a deconstruction machine). The expression "prolong a lock enabled interval" may, for example, means that the control chip 135 starts to "compare the input sequence with the predetermined sequence" only after a longer period of time has passed (as shown in step S330 of FIG. 3), such mechanism can prevent the host system from being subjected to a violent unlocking attack. Wherein, n can be related to the predetermined sequence, such that, n may be m times of an insertion number of the predetermined sequence, and m is greater than 2.

In one embodiment of the invention, when the system circuit board 130a is in standby (e.g., in S3/S5 state of the motherboard), the system circuit board 130a provides a standby power supply voltage VSTB to the dual power supply circuit 133, such that the dual power supply circuit 133 receives the standby power supply voltage VSTB. Next, the dual power supply circuit 133 transmits the standby power supply voltage VSTB as an operating power to the control chip 135, such that the control chip 135 is activated by drawing the standby power supply voltage VSTB of the system circuit board 130a, and detects the input sequences in which the universal serial bus ports 131 are being inserted.

Furthermore, when the dual power supply circuit 133 receives the external power supply voltage VBUS but does not receive the standby power supply voltage VSTB, the dual power supply circuit 133 provides the external power supply voltage VBUS as the operating power to the control chip 135; when the dual power supply circuit 133 receives the standby power supply voltage VSTB, regardless whether the external power supply voltage VBUS is received or not, the dual power supply circuit 133 only provides the standby power supply voltage VSTB as the operating power to the control chip 135.

In one embodiment of the invention, when the system circuit board 130a is turned on, that is, the host system 100 is in a power on state, the chipset 137 and the basic input and output system 139 are in the activated state, namely, in an operable state. If the user locks the electronic lock 120 via the human-machine interface provided by the basic input and output system 139, the chipset 137, as being controlled by the basic input and output system 139, provides a lock command CMD_L to the control chip 135 so as to command the control chip 135 to provide the lock signal SLK to the electronic lock. On the contrary, if the user unlocks the electronic lock 120 via the human-machine interface provided by the basic input and output system 139, the chipset 137, as being controlled by the basic input and output system 139, provides an unlock command CMD_U to the control chip 135 so as to command the control chip 135 to provide the unlock signal SUL to the electronic lock.

Figure 3:
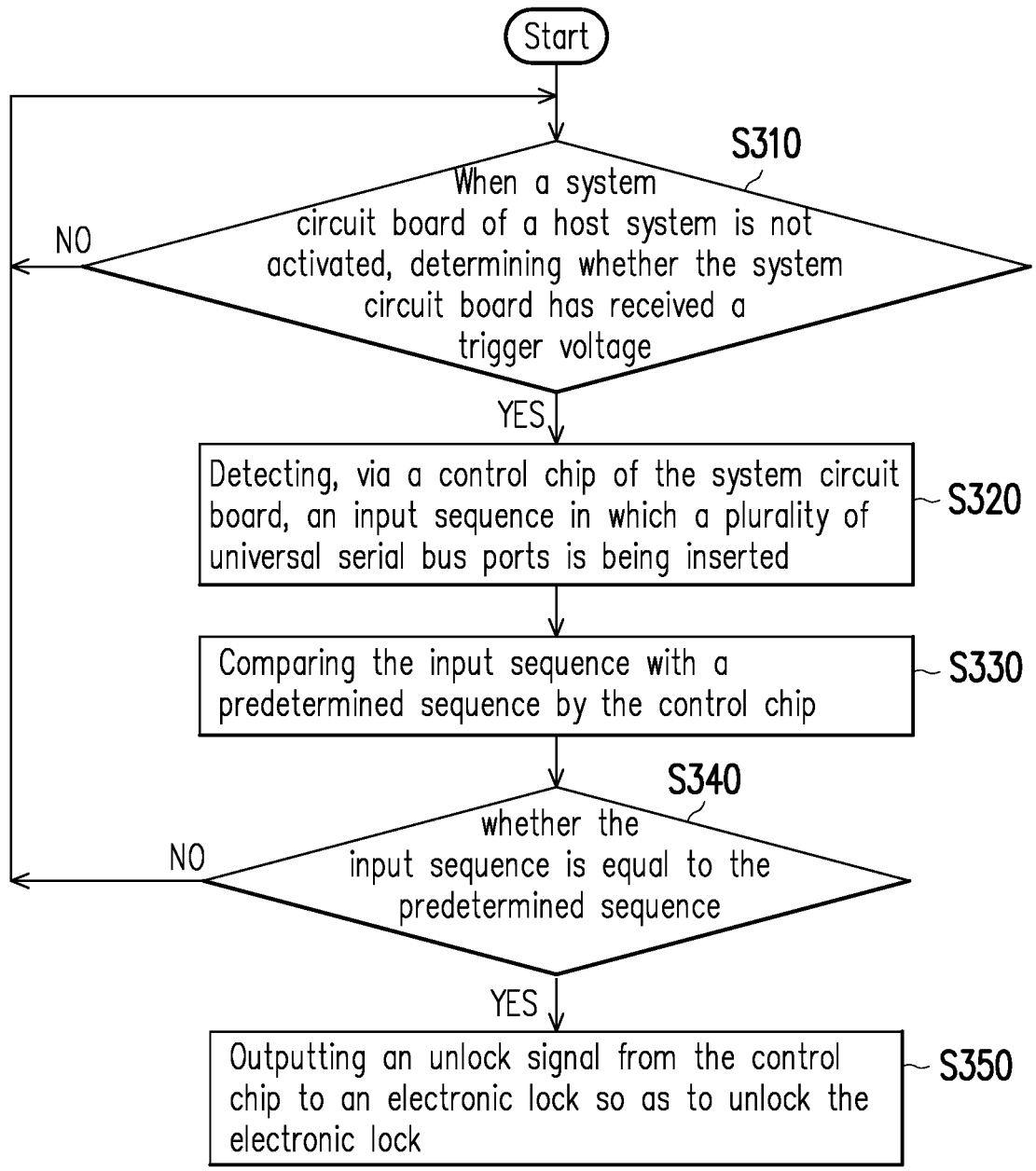
FIG. 3 is a flow chart illustrating a method for unlocking an electronic lock of a host system according to an embodiment of the invention.

FIG. 3 is a flow chart illustrating a method for unlocking an electronic lock of a host system according to an embodiment of the invention. Referring to FIG. 3, in the present embodiment, the method for unlocking the electronic lock of the host system includes the following steps. In step S310, when the system circuit board of the host system is not activated, determining whether the system circuit board has received a trigger voltage. When the system circuit board does not receive the trigger voltage, that is, a determination result for step S310 is "NO", then returning to step S310; when the system circuit board receives the trigger voltage, that is, the determination result for step S310 is "YES", then executing step S320. Before the step S310, a step of detecting whether the system circuit board of the host system is not activated may also be included, and the step S310 is to be executed when the system circuit board is not activated. In the step S320, detecting, via the control chip of the system circuit board, an input sequence in which a plurality of universal serial bus ports is being inserted.

In step S330, comparing the input sequence with a predetermined sequence by the control chip. In step S340, determining whether the input sequence is equal to the predetermined sequence. When the input sequence is not equal to the predetermined sequence, that is, a determination result for the step S340 is "NO", then returning to the step S310; when the input sequence is equal to the predetermined sequence, that is, the determination result for the step S340 is "YES", then executing step S350. In the step S350, outputting an unlock signal from the control chip to the electronic lock so as to unlock the electronic lock. It is to be noted that, the order of the steps S310, S320, S330, S340, and S350 are merely provided for illustration, but the embodiment of the invention is not limited thereto. Moreover, details for the steps S310, S320, S330, S340, and S350 can be referred to the descriptions for the embodiments of FIG. 1 and FIG. 2, and will not be repeated herein.

In summary, in the host system and the method for unlocking the electronic lock of the embodiments of the invention, when the not activated system circuit board is influenced by the trigger voltage to enable the components related to the security authentication mechanism to be activated, the system circuit board can detect the input sequence in which the universal serial bus ports are being inserted to determine whether or not to unlock the electronic lock. This allows the user to enter the security authentication mechanism under the condition that the system circuit board is not activated, so as to unlock the electronic lock.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A host system, comprising:
a chassis, having a side door;
an electronic lock, arranged on the side door for locking the side door on the chassis; and
a system circuit board, disposed within the chassis and coupled to the electronic lock, the system circuit board having a plurality of universal serial bus ports, wherein when the system circuit board is not activated and receives a trigger voltage, the system circuit board detects an input sequence in which the universal serial bus ports are being inserted by a universal serial bus device, and when the input sequence is equal to a predetermined sequence, the system circuit board outputs an unlock signal to the electronic lock so as to unlock the electronic lock.

2. The host system as recited in claim 1, wherein the system circuit board comprises a control chip, coupled to the universal serial bus ports and the electronic lock for detecting the input sequence in which the universal serial bus ports are being inserted, and outputting the unlock signal to the electronic lock when the input sequence is equal to the predetermined sequence.

3. The host system as recited in claim 2, wherein when the system circuit board is turned off, the control chip draws an external power supply voltage from a universal serial bus device inserted in the universal serial bus ports to serve as an operating power.

4. The host system as recited in claim 3, wherein the universal serial bus device comprises a portable power supply and a voltage adaptor having a universal serial bus plug.

5. The host system as recited in claim 2, wherein when the system circuit board is on standby, the control chip draws a standby power supply voltage of the system circuit board to serve as an operating power.

6. The host system as recited in claim 2, wherein the system circuit board further comprises a dual power supply circuit coupled to the universal serial bus ports and the control chip for receiving an external power supply voltage from a universal serial bus device inserted in the universal serial bus ports and a standby power supply voltage of the system circuit board, wherein when the external power supply voltage is received while the standby power supply voltage is not received, the dual power supply circuit provides the external power supply voltage to the control chip, and when the standby power supply voltage is received, the dual power supply circuit provides the standby power supply voltage to the control chip regardless whether or not the external power supply voltage is received.

7. The host system as recited in claim 3, wherein the system circuit board is a motherboard.

8. The host system as recited in claim 7, wherein the system circuit board further comprises a chipset coupled to the control chip, wherein when the system circuit board is turned on, the chipset is configured to command the control chip to provide the unlock signal or a lock signal to the electronic lock.

9. The host system as recited in claim 1, wherein if the control chip detects n times of insertion but the input sequence is not equal to the predetermined sequence, then the control chip enters into an unlock disabled interval, wherein n is m times of an insertion number of the predetermined sequence, and m is greater than 2.

10. A method for unlocking an electronic lock of a host system, comprising:
when a system circuit board of the host system is not activated, determining whether the system circuit board has received a trigger voltage;
when the system circuit board is not activated and the trigger voltage is received, detecting, via a control chip of the system circuit board, an input sequence in which a plurality of universal serial bus ports is being inserted by a universal serial bus device;
comparing the input sequence with a predetermined sequence by the control chip; and
when the input sequence is equal to the predetermined sequence, outputting an unlock signal from the control chip to the electronic lock so as to unlock the electronic lock.

11. The method for unlocking the electronic lock of the host system as recited in claim 10, further comprising:
when the system circuit board of the host system is turned off, drawing, by the control chip, an external power supply voltage from a universal serial bus device inserted in the universal serial bus ports to serve as an operating power.

12. The method for unlocking the electronic lock of the host system as recited in claim 11, wherein the universal serial bus device comprises a portable power supply and a voltage adaptor having a universal serial bus plug.

13. The method for unlocking the electronic lock of the host system as recited in claim 10, further comprising:
when the system circuit board is on standby, drawing, by the control chip, a standby power supply voltage of the system circuit board to serve as an operating power.

14. The method for unlocking the electronic lock of the host system as recited in claim 10, wherein the system circuit board is a motherboard.

15. A host system, comprising:
a chassis, having a side door;
an electronic lock, arranged on the side door for locking the side door on the chassis; and
a system circuit board, disposed within the chassis and coupled to the electronic lock, the system circuit board having a plurality of universal serial bus ports, wherein when the system circuit board is not activated and receives a trigger voltage, the system circuit board detects an input sequence in which the universal serial bus ports are being inserted by an external electric device, and when the input sequence is equal to a predetermined sequence, the system circuit board outputs an unlock signal to the electronic lock so as to unlock the electronic lock.

* * * * *